C. D. VAN ALLEN.
Churn.
No. 32,907.
Patented July 23, 1861.
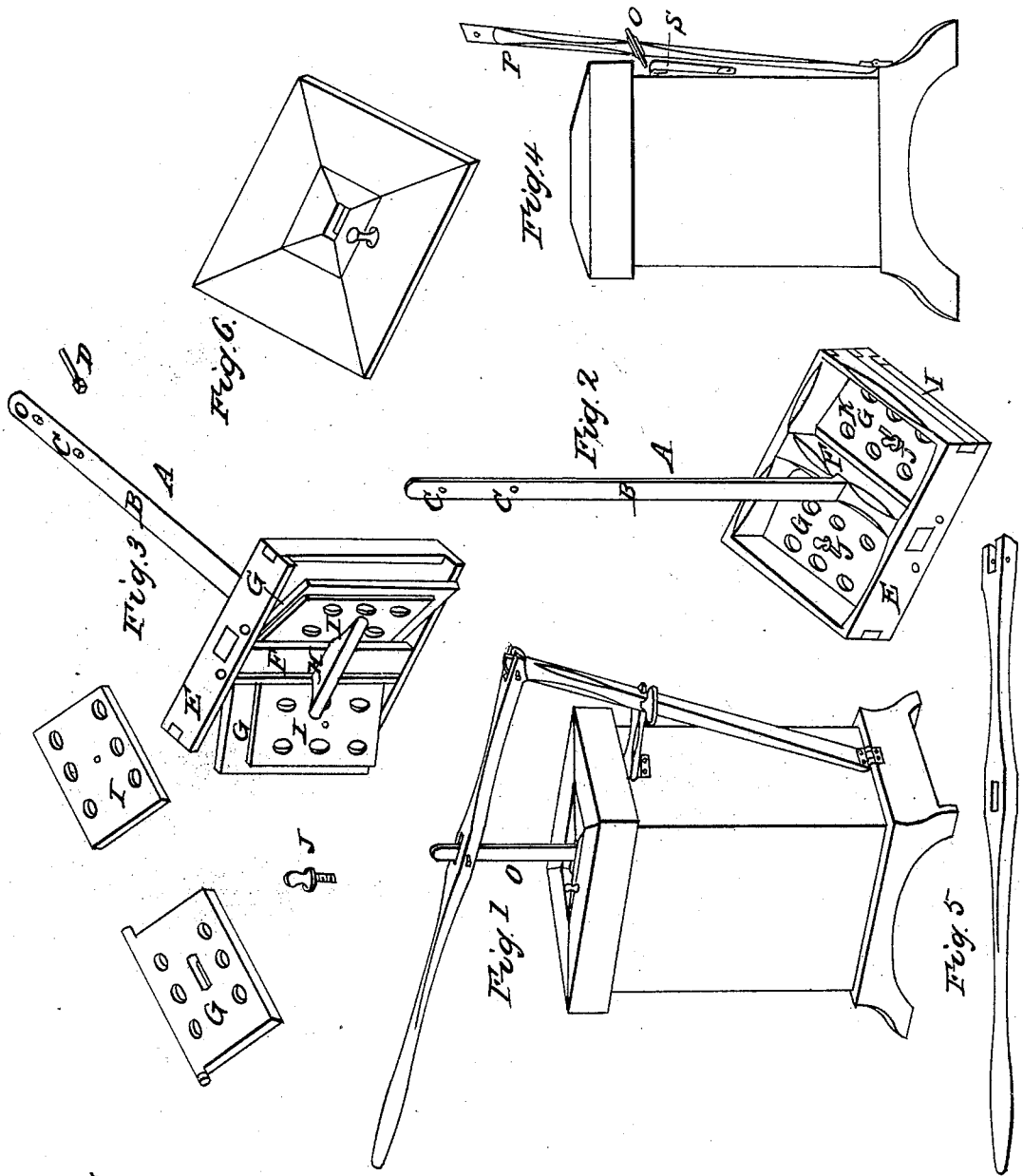

UNITED STATES PATENT OFFICE.

C. D. VAN ALLEN, OF SYRACUSE, NEW YORK.

CHURN.

Specification of Letters Patent No. 32,907, dated July 23, 1861.

*To all whom it may concern:*

Be it known that I, CICERO D. VAN ALLEN, of the city of Syracuse, in the county of Onondaga and State of New York, have invented a new and useful Improvement in Churns; and I do hereby declare that the following is a full and exact description thereof, reference being had to the accompanying drawings and to the letters of reference marked thereon.

The nature of my invention consists in providing valves or wings attached to the dasher of churns, with adjustable slides, for the purpose of enlarging or contracting apertures made through the valves or wings in the manner hereinafter stated.

It also consists in the manner of attaching the lever, by which the dash is operated to the body of the churn, to facilitate the packing up of the whole for transportation.

In the drawings, Figure 1 represents a perspective view of the churn, with its parts together in readiness for churning. Figs. 2 and 3 represent perspective views of the churn dasher. Fig. 4 represents the fulcrum standard as it is arranged for packing the churn for transportation. Fig. 5 represents the lever bar for working the dasher. Fig. 6 represents the cover.

To enable others skilled in the art to make and use my invention I will proceed to describe its construction and operation.

I construct my churn of wood or of other material, and of a square or round form as may be most convenient. I make the dasher A to consist of a rod B having holes C for the lever-bar pin D. At the lower end of the rod B attach the frame E which should be made to nearly fill the body of the churn. To the frame E attach the valves or wings G by hinge joints so that the valves or wings will close against the frame E when the dash is forced downward into the cream or milk, and drop downward on raising the dash.

H is a stop attached to the center bar of the dash having its ends projecting over the valves or wings to prevent them opening too far downward when the dash is being raised.

To the under surface of the valves or wings attach the slides I by the set screws J and through the valves or wings make several holes K corresponding with like sized holes through the valves or wings—the slides are made shorter than the valves or wings so as to allow the slides to move sufficient to cover the holes in the valves or wings. By the set screw and the slot L the slides I may be so moved or adjusted as to contract or diminish the diameter of the holes through the valves or wings.

The object of the slides is to enlarge or diminish the holes in the valves or wings to facilitate the churning or breaking of cream. The object of the valves or wings opening as the dasher is raised, is, to allow the cream or butter to pass through the dash—thereby relieving the dasher of the entire weight of the cream or butter.

What I claim as my invention and desire to secure by Letters Patent, is—

The combination of the perforated adjustable slide I with the perforated dasher A substantially as described.

C. D. VAN ALLEN.

Witnesses:
J. W. PHILLIPS,
L. F. SMITH.